(12) United States Patent
Lin et al.

(10) Patent No.: US 9,174,606 B2
(45) Date of Patent: Nov. 3, 2015

(54) HARNESS RETAINER FOR JUVENILE VEHICLE SEAT

(71) Applicant: Cosco Management, Inc., Wilmington, DE (US)

(72) Inventors: Meihui Lin, Nashville, IN (US); Paul D Gaudreau, Jr., Indianapolis, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 13/934,363

(22) Filed: Jul. 3, 2013

(65) Prior Publication Data

US 2014/0008960 A1 Jan. 9, 2014

(51) Int. Cl.
| | |
|---|---|
| *B60N 2/26* | (2006.01) |
| *B60N 2/28* | (2006.01) |
| *B60R 22/10* | (2006.01) |
| *A44B 11/25* | (2006.01) |
| *A47D 15/00* | (2006.01) |
| *B60R 22/30* | (2006.01) |
| *B60R 22/02* | (2006.01) |

(52) U.S. Cl.
CPC ............. *B60R 22/30* (2013.01); *A44B 11/2511* (2013.01); *A44B 11/2519* (2013.01); *A47D 15/006* (2013.01); *B60N 2/265* (2013.01); *B60N 2/2812* (2013.01); *B60R 22/105* (2013.01); *B60N 2002/2818* (2013.01); *B60R 2022/027* (2013.01)

(58) Field of Classification Search
CPC .... B60N 2/2812; B60N 2/2803; B60N 2/265; B60R 22/105; B60R 22/024; B60R 2022/027; A44B 11/266; A44B 11/2511; A44B 11/263; A44B 17/0029; A47D 15/006

USPC ............. 297/216.11, 468, 483, 484, 486; 24/615, 652, 662, 664, 665, 669, 677, 24/166

See application file for complete search history.

(56) References Cited

U.S. PATENT DOCUMENTS

| | | | |
|---|---|---|---|
| 3,954,280 A | | 5/1976 | Roberts et al. |
| 4,398,324 A | * | 8/1983 | Bakker et al. ................... 24/629 |
| 4,497,094 A | * | 2/1985 | Morris ............................ 24/633 |
| 4,540,218 A | | 9/1985 | Thomas |
| 4,998,328 A | * | 3/1991 | Tanaka ............................ 24/639 |
| 5,263,234 A | * | 11/1993 | Fudaki ............................ 24/662 |
| 5,319,836 A | * | 6/1994 | Ida ................................. 24/625 |
| 5,380,067 A | * | 1/1995 | Turvill et al. ................. 297/484 |
| 5,709,014 A | * | 1/1998 | Takahashi ....................... 24/614 |
| 5,784,767 A | * | 7/1998 | Doty, Jr. .......................... 24/665 |
| 5,873,635 A | | 2/1999 | Merrick |
| 6,309,024 B1 | * | 10/2001 | Busch ........................... 297/484 |
| 6,393,677 B1 | | 5/2002 | Anscher |
| 6,543,101 B2 | | 4/2003 | Sack et al. |
| 6,619,753 B2 | | 9/2003 | Takayama |
| 6,662,413 B2 | * | 12/2003 | Glover ............................ 24/615 |
| 6,694,578 B1 | * | 2/2004 | Nicoll ............................. 24/645 |
| 6,711,790 B2 | | 3/2004 | Pontaeo |

(Continued)

*Primary Examiner* — Ryan Kwiecinski
(74) *Attorney, Agent, or Firm* — Barnes & Thornburg LLP (57) ABSTRACT

A harness retainer for use with a juvenile vehicle seat in accordance with the present disclosure may include a first belt mount that couples to a first harness belt, a second belt mount that couples to a second harness belt and couples to the first belt mount, and a lock that moves from a locked configuration to an unlocked configuration, wherein the lock moves from the locked configuration, blocking movement of the first belt mount away from the second belt mount, to the unlocked configuration, allowing movement of the first belt mount away from the second belt mount.

20 Claims, 10 Drawing Sheets

(56) References Cited

U.S. PATENT DOCUMENTS

| | | | |
|---|---|---|---|
| 6,874,596 | B2 | 4/2005 | Zeissler et al. |
| 7,007,353 | B2 | 3/2006 | Bergkvist |
| 7,252,342 | B2 | 8/2007 | Patrizi et al. |
| 7,367,092 | B1* | 5/2008 | Dilday .......................... 24/615 |
| 7,426,771 | B2 | 9/2008 | Patrizi et al. |
| 7,770,267 | B2 | 8/2010 | Chen et al. |
| 7,882,604 | B2* | 2/2011 | Suzuki .......................... 24/633 |
| 7,992,269 | B2 | 8/2011 | Patrizi et al. |
| 8,813,320 | B2* | 8/2014 | Zhao ........................ 24/579.11 |
| 2003/0204940 | A1* | 11/2003 | Glover .......................... 24/615 |
| 2004/0207246 | A1* | 10/2004 | Delventhal et al. ............ 297/484 |
| 2006/0070215 | A1* | 4/2006 | Sung ............................ 24/615 |
| 2006/0290192 | A1* | 12/2006 | DeLellis et al. ............... 297/469 |
| 2007/0214617 | A1* | 9/2007 | Niwa ............................ 24/615 |
| 2008/0028579 | A1* | 2/2008 | Chen ............................ 24/625 |
| 2011/0107565 | A1* | 5/2011 | Shen ............................ 24/633 |
| 2013/0125355 | A1* | 5/2013 | Thorbole et al. ............... 24/633 |
| 2013/0160253 | A1* | 6/2013 | Novara .......................... 24/642 |
| 2014/0007388 | A1* | 1/2014 | Hartnell ........................ 24/633 |
| 2014/0103697 | A1* | 4/2014 | Mason et al. ................. 297/484 |

* cited by examiner

HARNESS RETAINER FOR JUVENILE VEHICLE SEAT

PRIORITY CLAIM

This application claims priority under 35 U.S.C. §119(a) to Chinese Utility Model Application No. 201220329884.1 filed Jul. 6, 2012 and issued as Chinese Utility Model No. ZL201220329884.1, which is expressly incorporated by reference herein.

TECHNICAL FIELD

The present disclosure relates to a harness retainer and, in particular, to a harness retainer for use with a juvenile vehicle seat including a harness with a left harness belt and a right harness belt that extend over the shoulders of a child seated in the juvenile vehicle seat.

BACKGROUND

A harness retainer includes a first belt mount that couples to a left harness belt, a second belt mount that couples to a right harness belt, and a lock formed with one of the first element or the second element. However, there is a need for a harness retainer that includes a lock that is not formed with the first element and a second element.

SUMMARY

To this end, the present disclosure provides a harness retainer for a juvenile vehicle seat.

A harness retainer for use with a juvenile vehicle seat in accordance with the present disclosure may include a first belt mount that couples to a first harness belt, a second belt mount that couples to a second harness belt and couples to the first belt mount, and a lock that moves from a locked configuration to an unlocked configuration, wherein the lock moves from the locked configuration, blocking movement of the first belt mount away from the second belt mount, to the unlocked configuration, allowing movement of the first belt mount away from the second belt mount.

According to an embodiment of the disclosure, the lock may include a key coupled to the first belt mount and a release actuator coupled to the second belt mount. The key may include a stem housed in the first belt mount and a catch extending out of the first belt mount. The catch may be one of C-shaped and I-shaped.

According to an embodiment of the disclosure, the release actuator may include a first button that moves perpendicular to a longitudinal axis of the second belt mount from a first position, engaging the catch to block movement of the first belt mount away from the second belt mount, to a second position, disengaging the catch to allow movement of the first belt mount away from the second belt mount.

According to an embodiment of the disclosure, the first button may be mounted to the second belt mount between a top side and a bottom side of the second belt mount. The first button may move toward a back side of the second belt mount when the first button moves from the first position to the second position.

According to an embodiment of the disclosure, the release actuator may include a second button that moves perpendicular to a longitudinal axis of the second belt mount from a first position, engaging the catch to block movement of the first belt mount away from the second belt mount, to a second position, disengaging the catch to allow movement of the first belt mount away from the second belt mount. The first button may be mounted to the second belt mount along a top side of the second belt mount to move toward a bottom side of the second belt mount when the first button moves from the first position to the second position. The second button may be mounted to the second belt mount along the bottom side, opposite the top side, of the second belt mount and may move toward the top side of the second belt mount when the second button moves from the first position to the second position.

According to an embodiment of the disclosure, the first belt mount and the second belt mount cooperate to form an oval shape when viewed from the front side of the second belt mount.

With the harness retainer in accordance with the present disclosure, a lock may separate from and be coupled to one of a first belt mount and a second belt mount.

Additional features of the present disclosure will become apparent to those skilled in the art upon consideration of illustrative embodiments exemplifying the best mode of carrying out the disclosure as presently perceived

BRIEF DESCRIPTION OF THE DRAWINGS

The detailed description particularly refers to the accompanying figures in which.

DETAILED DESCRIPTION

Figure 1:
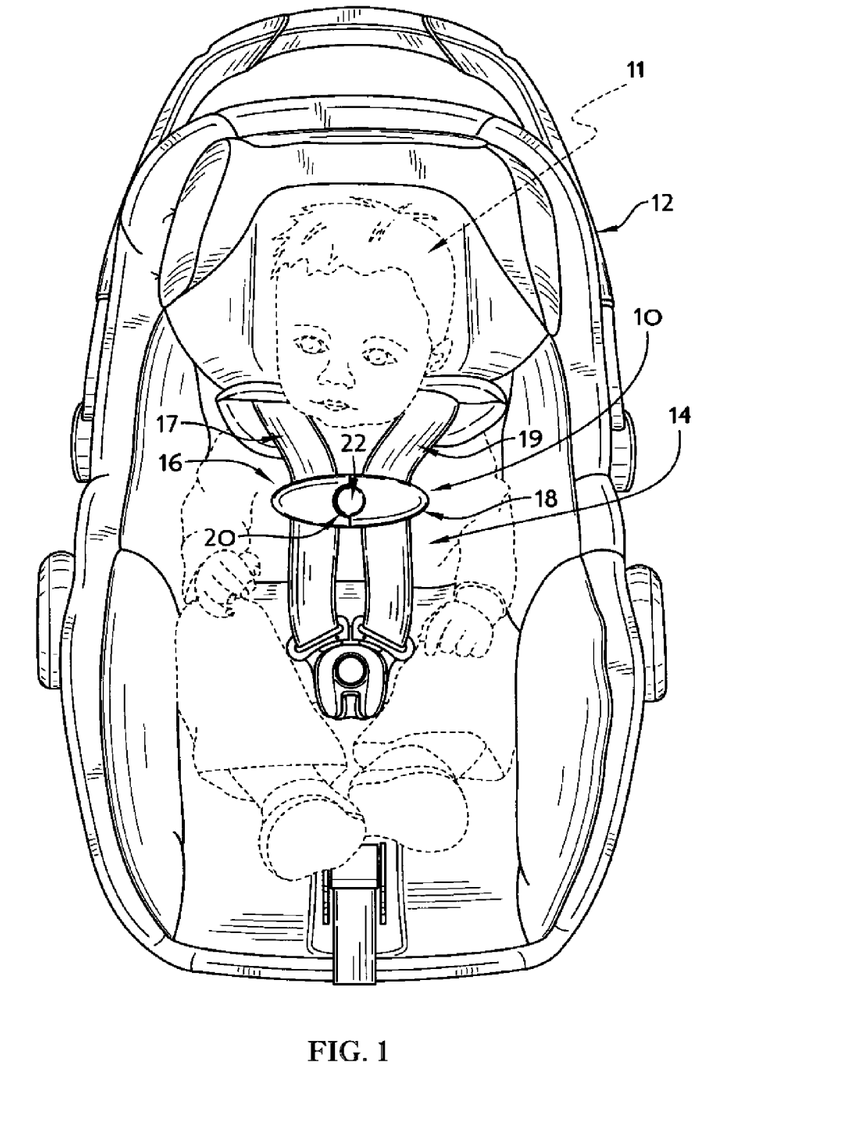
FIG. 1 is a perspective view of a harness retainer with a juvenile vehicle seat.

A first embodiment of a harness retainer 10 in accordance with the present disclosure is shown in FIG. 1. Harness retainer 10 is used with a juvenile vehicle seat 12 to guide a harness 14 included in vehicle seat 12 along the chest of a child 11 seated in vehicle seat 12 to block child 11 from exiting juvenile vehicle seat 12 as shown in FIG. 1. Harness retainer 10 includes a left belt mount 16 coupled to a left harness belt 17 included in harness 14 and a right belt mount 18 coupled to a right harness belt 19 included in harness 14 as shown in FIG. 1. Harness retainer 10 also includes a lock 20 that provides means for releasing left belt mount 16 from right belt mount 18 in response to a user applying a force F to lock 20 that is separate from left belt mount 16 and right belt mount 18 so that left belt mount 16 may be moved away from right belt mount 18 to allow child 11 to exit juvenile vehicle seat 12 as suggested in FIGS. 6-8A.

Figure 2:
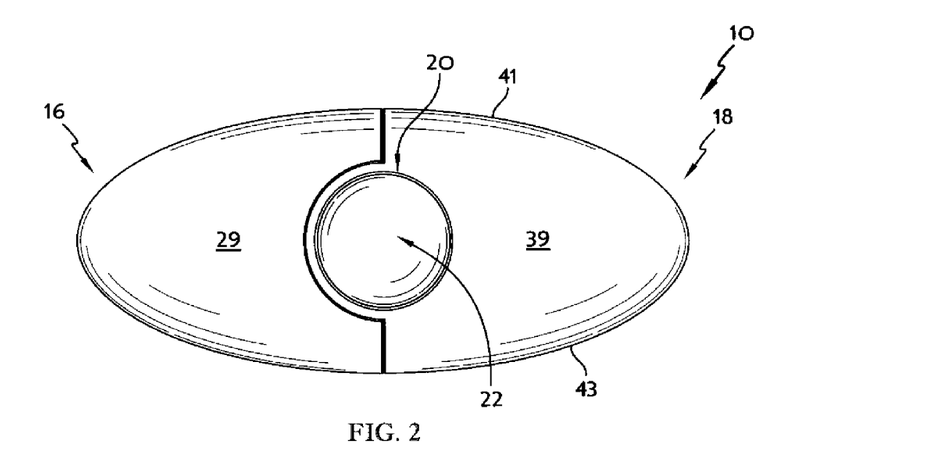
FIG. 2 is front elevation view of the harness retainer of FIG. 1.

In the illustrative embodiment, left belt mount 16 and right belt mount 18 cooperate to form a generally oval shape when viewed from the front side as shown in FIG. 2. User applies force F to a button 22 included in lock 20. As an example, button 22 is round when viewed from the front side as shown in FIG. 2. The outer surface of each of left belt mount 16, right belt mount 18, and button 22 may be formed from a plastics material and overmolded with thermoplastic elastomer (TPE), rubber, or another suitable material to provide a soft tactile sensation to the user.

Figure 4:
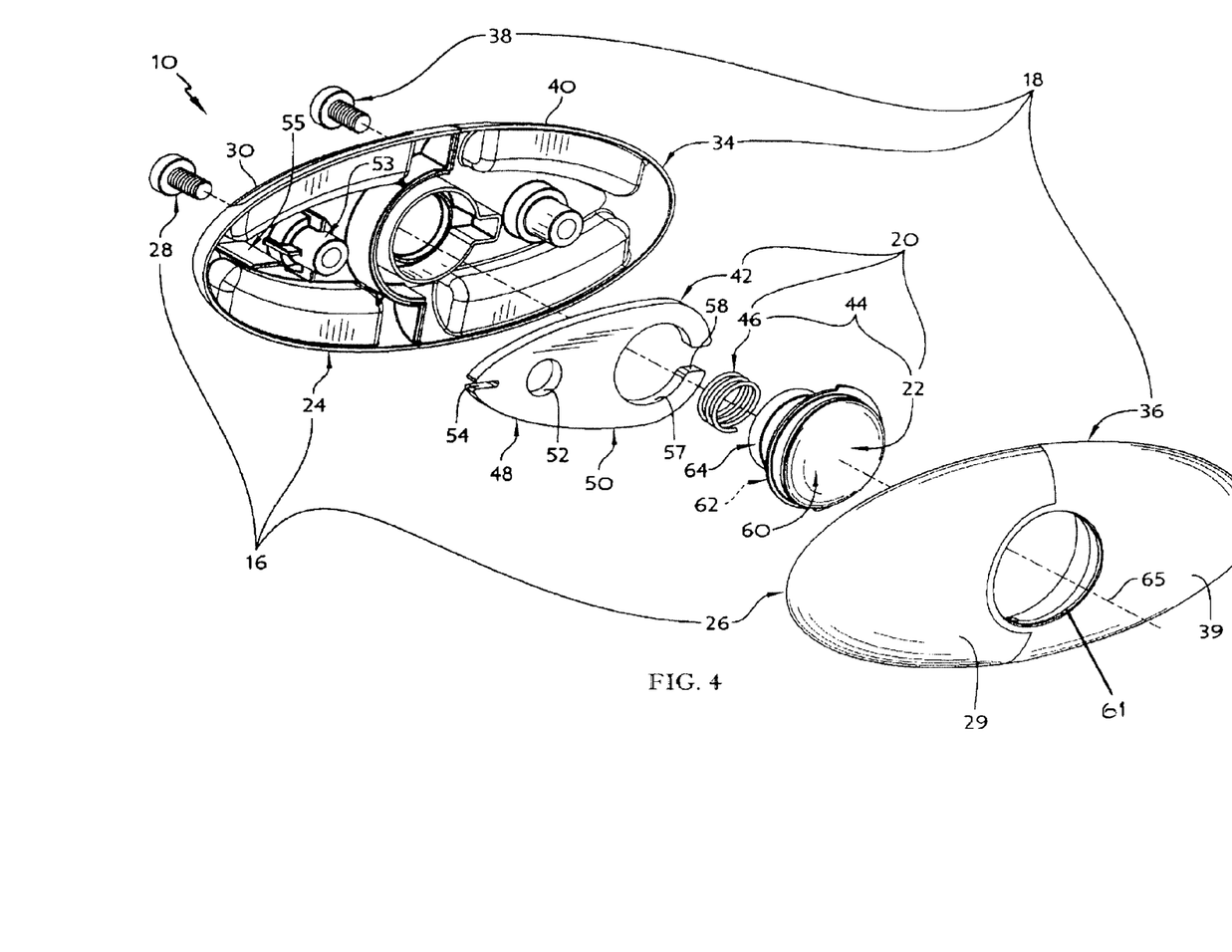
FIG. 4 is an exploded assembly view of the harness retainer of FIG. 1.
Figures 5, 5A, 5B:
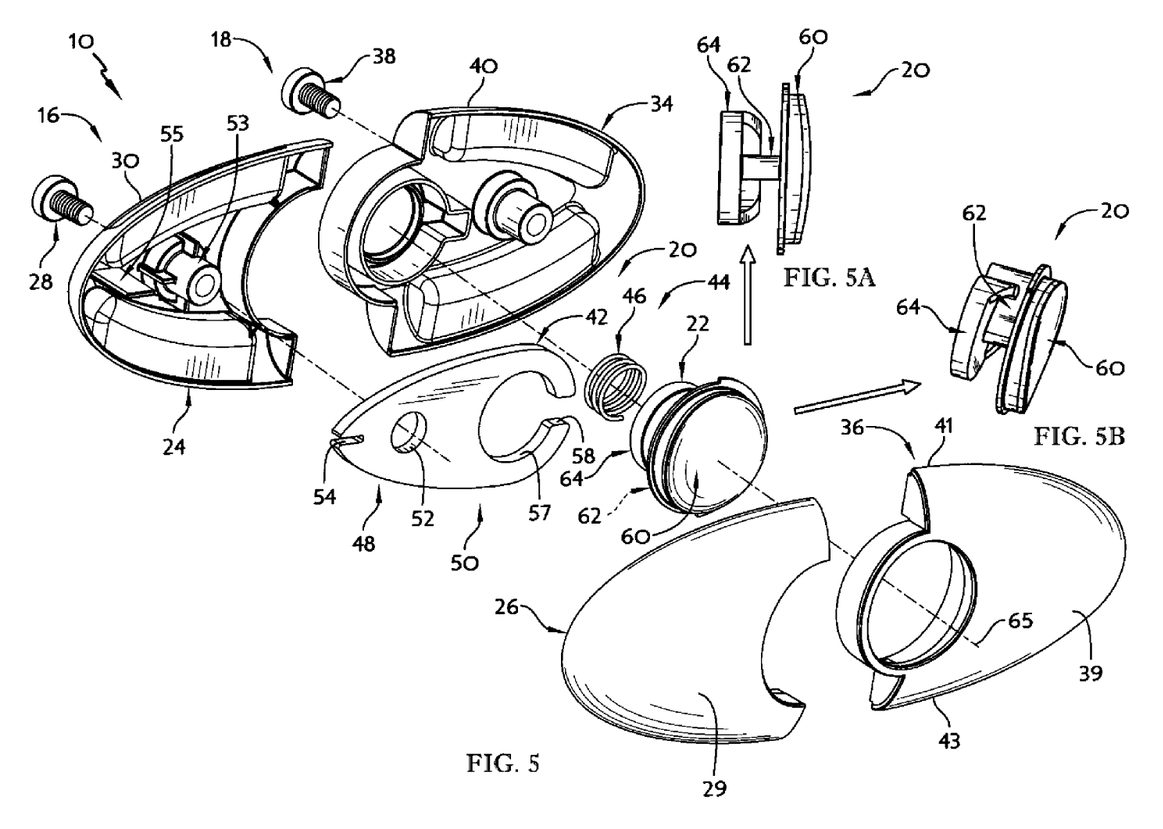
FIG. 5 is another exploded assembly view of the harness retainer of FIG. 1.
FIG. 5A is a side elevation view of a button included in the harness retainer of FIG. 5.
FIG. 5B is a top perspective view of the button included in the harness retainer of FIG. 5.

Left belt mount 16 of harness retainer 10 is coupled to left harness belt 17 and includes a rear shell 24, a front shell 26, and a threaded fastener 28 as shown in FIGS. 4 and 5. Rear shell 24 is monolithic and forms a rear side 30 of left belt mount 16. Front shell 26 is monolithic and forms a front side 29 of left belt mount 16. Fastener 28 extends through rear shell 24 and engages front shell 26 to couple rear shell 24 to front shell 26.

Right belt mount 18 of harness retainer 10 is coupled to right harness belt 19 and includes a rear shell 34, a front shell 36, and a threaded fastener 38 as shown in FIGS. 4 and 5. Rear shell 34 is monolithic and forms a rear side 40 of right belt mount 18. Front shell 36 is monolithic and forms a front side 39 of right belt mount 18. Fastener 38 extends through rear shell 34 and engages front shell 36 to couple rear shell 34 to front shell 36.

Figures 6, 6A:
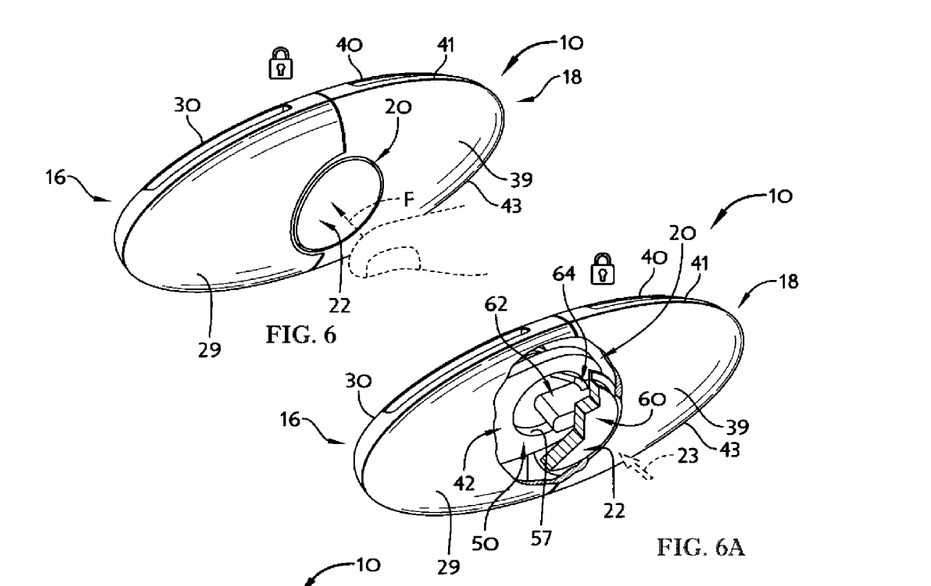
FIG. 6 is perspective view of the harness retainer of FIG. 1.
FIG. 6A is a perspective view of the harness retainer of FIG. 6 with portions broken away.
Figures 7, 7A:
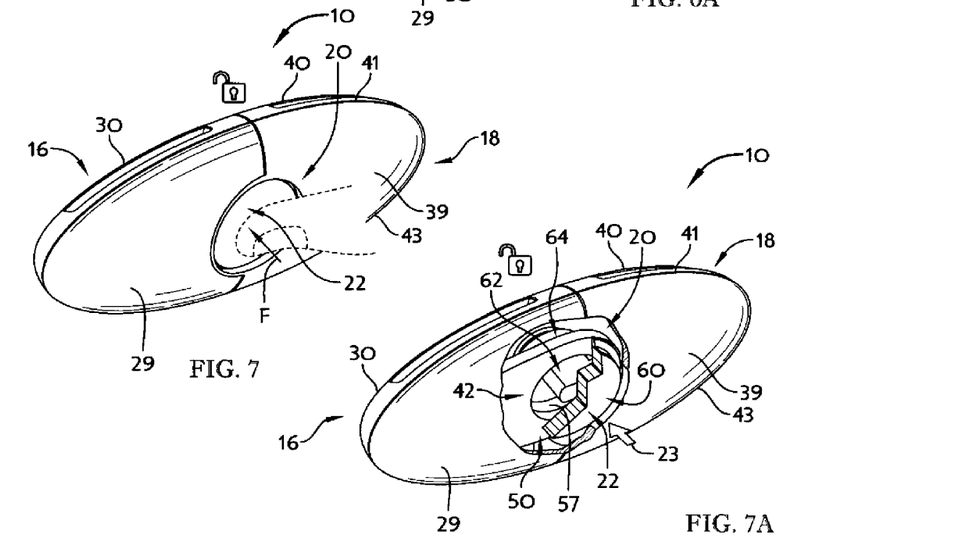
FIG. 7 is perspective view of the harness retainer of FIG. 1.
FIG. 7A is a perspective view of the harness retainer of FIG. 7 with portions broken away.
Figure 8:
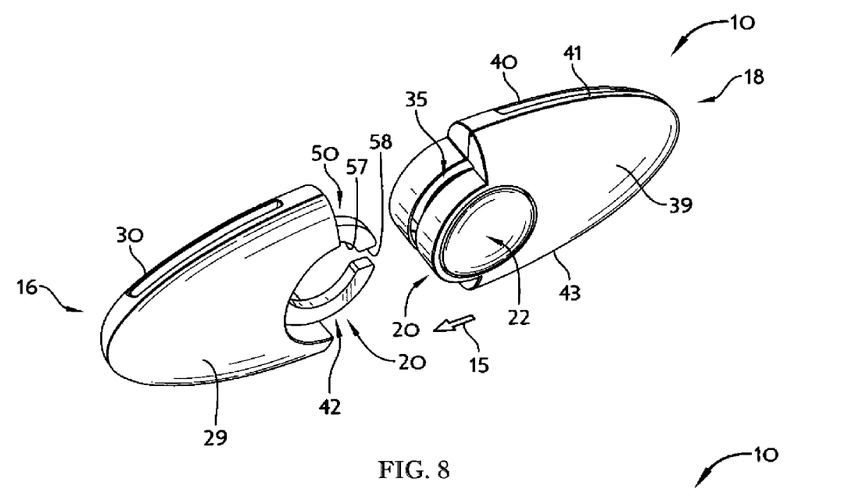
FIG. 8 is perspective view of the harness retainer of FIG. 1.
Figure 8A:
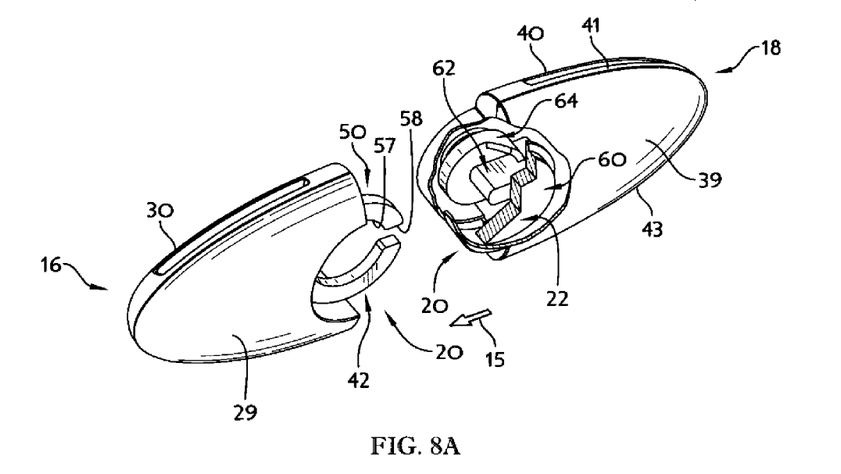
FIG. 8A is a perspective view of the harness retainer of FIG. 8 with portions broken away.

Lock 20 moves from a locked configuration to an unlocked configuration as shown in FIGS. 6-8A. In the locked configuration, lock 20 blocks movement of left belt mount 16 away from right belt mount 18 as shown in FIGS. 6 and 6A. In the unlocked configuration, lock 20 allows movement of left belt mount 16 away from right belt mount 18 as shown in FIGS. 7 and 7A. Thus, when lock 20 is in the unlocked configuration, a caregiver can move left belt mount 16 away from right belt mount 18, as shown in FIGS. 8 and 8A, so that left harness belt 17 and right harness belt 19 are spaced apart to allow child 11 seated in vehicle seat 12 to exit vehicle seat 12.

Figure 3:
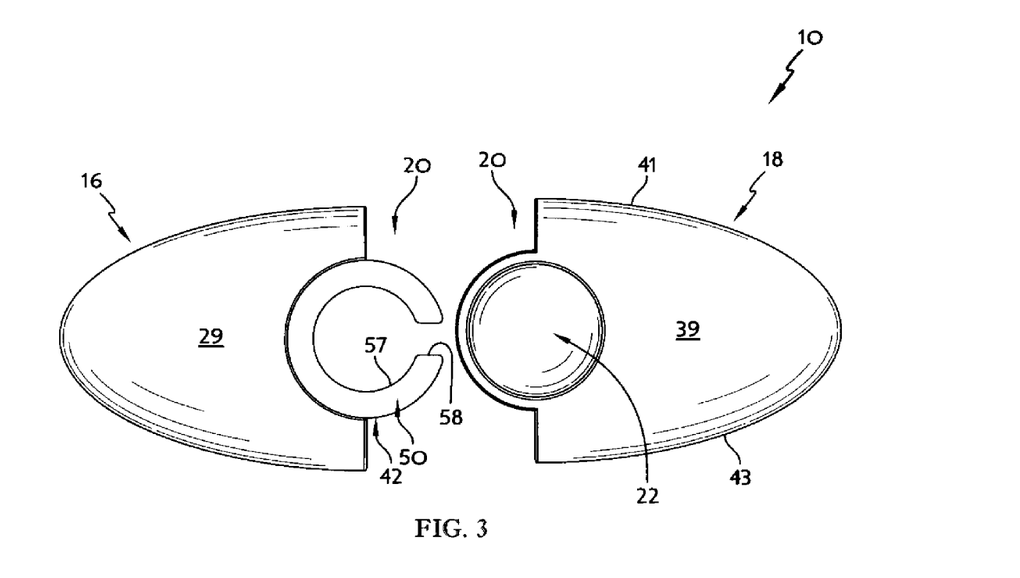
FIG. 3 is another front elevation view of the harness retainer of FIG. 1.

Lock 20 includes a key 42, button 22, and a spring 46 as shown in FIGS. 4 and 5. Key 42 is coupled to left belt mount 16 and extends out from left belt mount 16 as shown in FIG. 3. Button 22 is coupled to right belt mount 18. Button 22 moves between an engaged position and a disengaged position. In the engaged position, button 22 contacts key 42 to block movement of left belt mount 16 away from right belt mount 18 as shown in FIGS. 6 and 6A. In the disengaged position, button 22 is out of contact with key 42, as shown in FIGS. 7 and 7A. As a result, button 22 allows movement of left belt mount 16 away from right belt mount 18 as shown in FIGS. 8-8A. Spring 46 is located between button 22 and rear shell 36 of right belt mount 18 to bias button 22 to the engaged position. Button 22 and spring 46 cooperate to form a release actuator 44 coupled to right belt mount 18.

Figure 9:
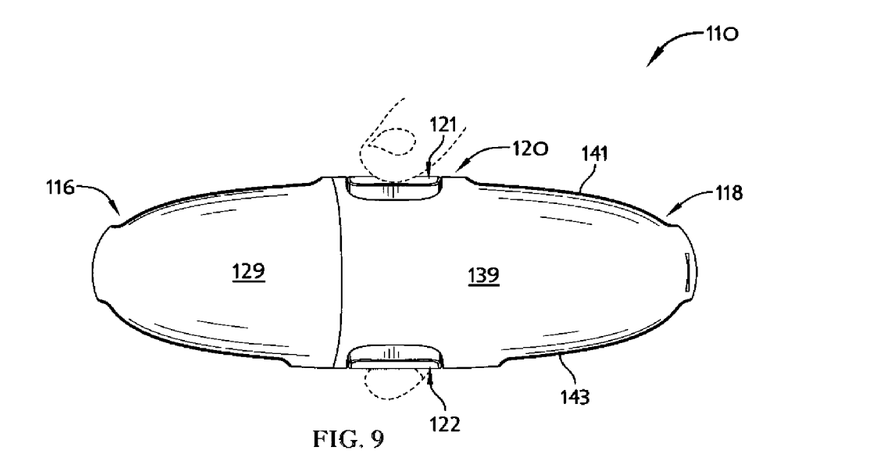
FIG. 9 is front elevation view of another harness retainer.

Key 42 is metallic in the illustrative embodiment and is sized to be received in an opening 35 formed between rear shell 34 and front shell 36 of right belt mount 18 as shown in FIG. 9. Key 42 includes a stem 48 and a catch 50 as shown, for example, in FIGS. 4 and 5. Stem 48 is received in left belt mount 16 and is formed to include a hole 52 and an anti-rotation slot 54. Hole 52 is sized to receive a post 53 formed by rear shell 24 of left belt mount 16. Post 53 extends perpendicular from rear side 30 of left belt mount 16 towards right belt mount 18 as suggested in FIG. 4A. Anti-rotation slot 54 is sized to receive a fin 55 formed by rear shell 24 of left belt mount 16 and blocks rotation of stem 48 about post 53. Fin 55 extends perpendicular from rear side 30 of left belt mount 16 as suggested in FIG. 4A. Catch 50 extends out of left belt mount 16 and is C-shaped forming an engagement opening 57 and a release slot 58.

Button 22 is mounted to right belt mount 18 between a top side 41 and a bottom side 43 of right belt mount 18 as shown in FIGS. 2 and 3. Button 22 moves toward rear side 40 of right belt mount 18 when button 22 moves from the engaged position to the disengaged position as shown in FIG. 7.

Button 22 is formed to include a press plate 60, a stem 62, and a blocker 64 as shown in FIGS. 4 and 5. Press plate 60 is accessible to a caregiver through an opening 61 formed in front shell 36 of right belt mount 18 so that a user can apply force F on press plate 60 as shown in FIG. 5. Stem 62 extends from press plate 60 and is sized to pass through release slot 58 of catch 50. Blocker 64 is coupled to stem 62 and is spaced apart from push plate 60 as shown in FIG. 6. Blocker 64 is sized to be received in the engagement opening 57 but is too large to pass through release slot 58 of catch 50.

In the locked configuration of lock 20, catch 50 of key 42 is inserted into slot 35 of the right belt mount 18 as shown in FIGS. 6 and 6A. Also, button 22 is in the engaged position so that blocker 64 is received in engagement opening 57 of catch 50 blocking removal of key 42 from slot 35 thereby blocking movement of left belt mount 16 relative to right belt mount 18 as shown in FIG. 6.

In the unlocked configuration of lock 20, button 22 is moved to the disengaged position by a user applying force F perpendicular to a longitudinal axis of harness retainer 10 toward back side 40 of right belt mount 18 onto press plate 60 of button 22 as suggested by arrow 23 in FIGS. 7 and 7A. When button 22 is in the disengaged position, blocker 64 is moved out of engagement opening 57 allowing removal of key 42 from slot 35 thereby allowing movement of left belt mount 16 relative to right belt mount 18 as suggested by arrow 15 in FIGS. 8 and 8A.

Another illustrative harness retainer 110 is shown in FIGS. 9-15 and is configured to be used with juvenile vehicle seat 12 to guide harness 14 included in vehicle seat 12 along the chest of a child seated in vehicle seat 12 to block the child from exiting juvenile vehicle seat 12. Harness retainer 110 includes a left belt mount 116 configured to be coupled to left harness belt 17 included in harness 14 and a right belt mount 118 configured to be coupled to right harness belt 19 included in harness 14. Harness retainer 110 also includes a lock 120 that provides means for releasing left belt mount 116 from right belt mount 118 in response to a user applying a force F to lock 120 so that left belt mount 116 may be moved away from right belt mount 118 to allow a child to exit juvenile vehicle seat 12 as suggested in FIGS. 9-10.

In the illustrative embodiment, left belt mount 116 and right belt mount 118 cooperate to form a generally oval shape when viewed from the front side as shown in FIG. 9. The outer surface of each of left belt mount 116, right belt mount 118, and buttons 121, 122 may be formed from a plastics material and overmolded with TPE, rubber, or another suitable material to provide a soft tactile sensation.

Figure 11:
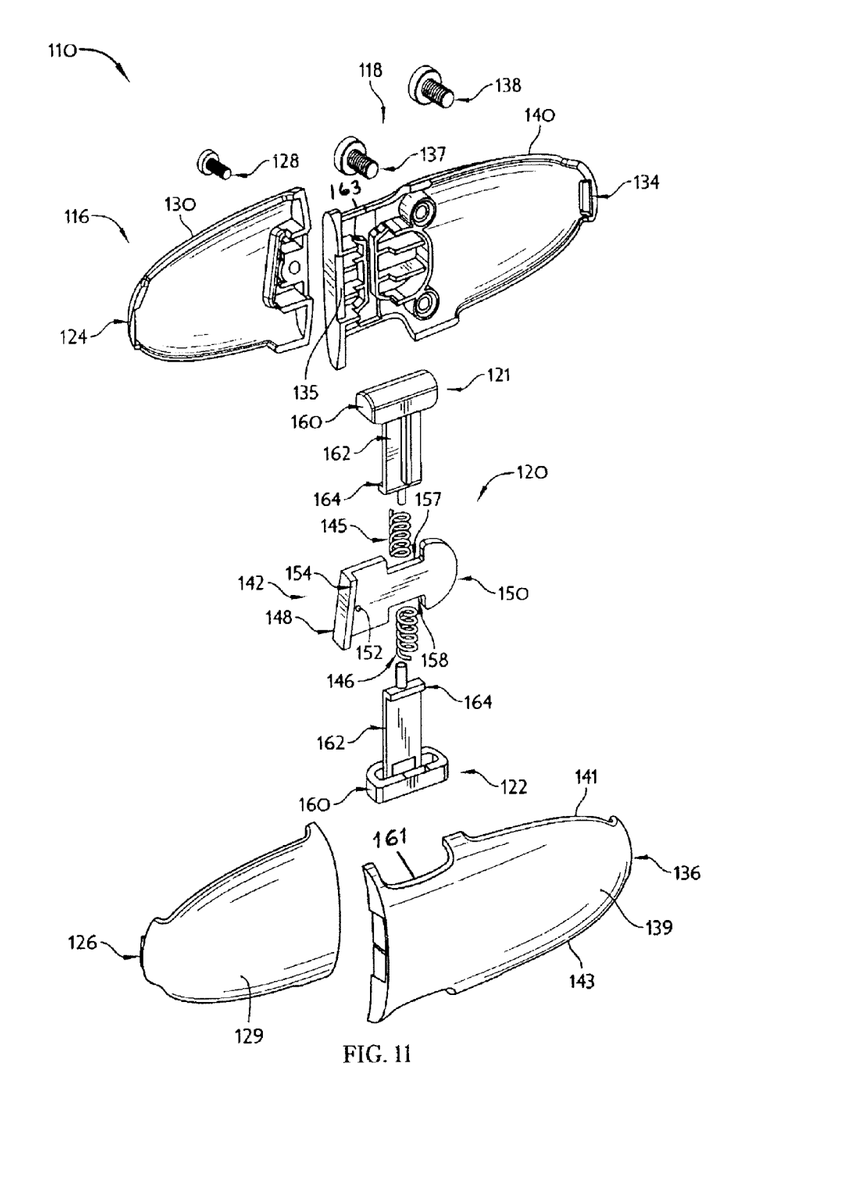
FIG. 11 is an exploded assembly view of the harness retainer of FIG. 8.

Left belt mount 116 of harness retainer 110 is configured to couple to left harness belt 17 and includes a rear shell 124, a front shell 126, and a threaded fastener 128 as shown in FIG. 11. Rear shell 124 is monolithic and forms a rear side 130 of left belt mount 116. Front shell 126 is monolithic and forms a front side 129 of left belt mount 116. Fastener 128 extends through rear shell 124 and engages front shell 126 to couple rear shell 124 to front shell 126.

Right belt mount 118 of harness retainer 110 is configured to couple to right harness belt 19 and includes a rear shell 134, a front shell 136, and a pair of threaded fasteners 137. 138 as shown in FIG. 11. Rear shell 134 is a monolithic component forming a rear side 140 of right belt mount 118. Front shell 136 is a monolithic component forming a front side 139 of right belt mount 118. Fasteners 137, 138 extend through rear shell 134 and engage front shell 136 to couple rear shell 134 to front shell 136.

Figure 12:
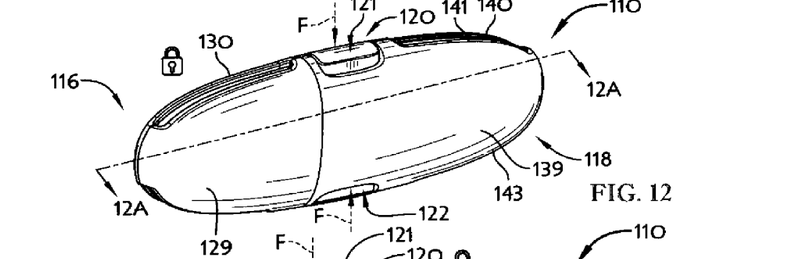
FIG. 12 is perspective view of the harness retainer of FIG. 9.
Figure 12A:
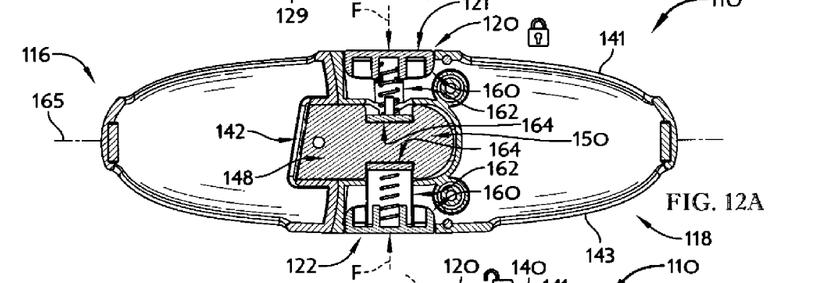
FIG. 12A is a sectional view taken along line 12A-12A of FIG. 12.
Figure 13:
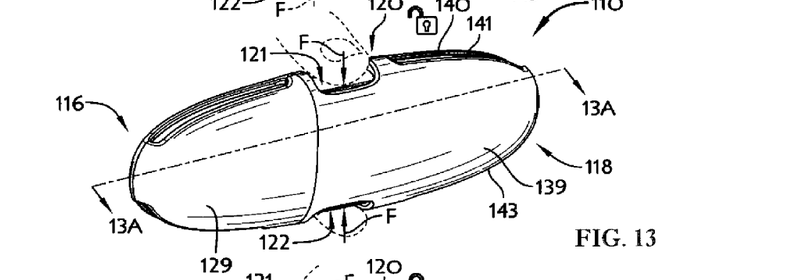
FIG. 13 is perspective view of the harness retainer of FIG. 9.
Figure 13A:
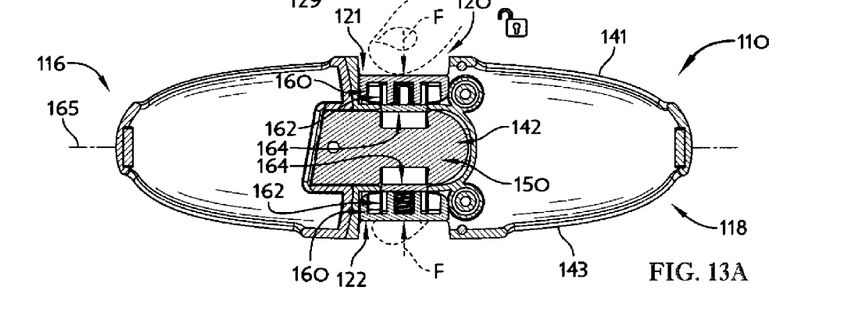
FIG. 13A is a sectional view taken along line 13A-13A of FIG. 13.
Figure 14:
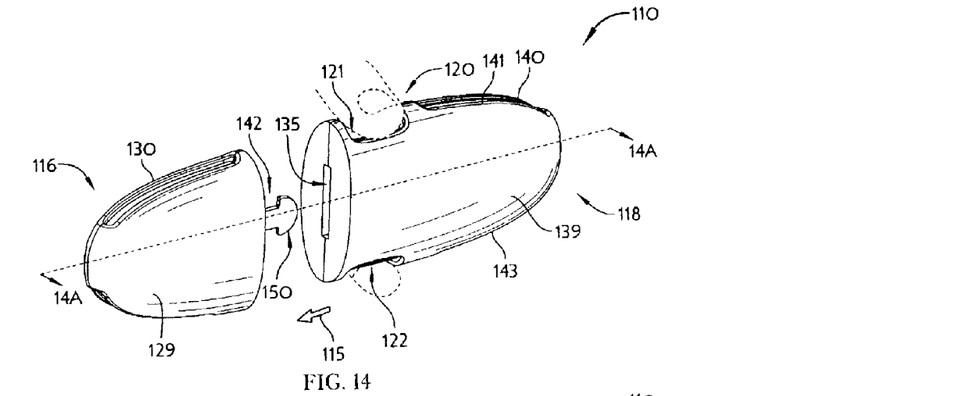
FIG. 14 is perspective view of the harness retainer of FIG. 9.
Figure 14A:
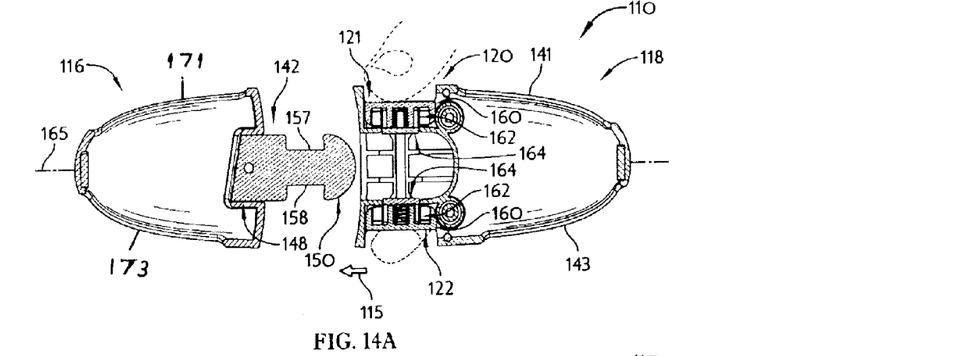
FIG. 14A is a sectional view taken along line 14A-14A of FIG. 14.

Lock 120 moves from a locked configuration to an unlocked configuration as shown in FIGS. 12-14A. In the locked configuration, lock 120 blocks movement of left belt mount 116 away from right belt mount 118 as shown in FIGS. 12 and 12A. In the unlocked configuration, lock 120 allows movement of left belt mount 116 away from right belt mount 118 as shown in FIGS. 13 and 13A. Thus, when lock 120 is in the unlocked configuration, a caregiver can move left belt mount 116 away from right belt mount 118, as shown in FIGS. 14 and 14A, so that left harness belt 17 and right harness belt 19 are spaced apart to allow a child seated in vehicle seat 12 to exit vehicle seat 12.

Figure 10:
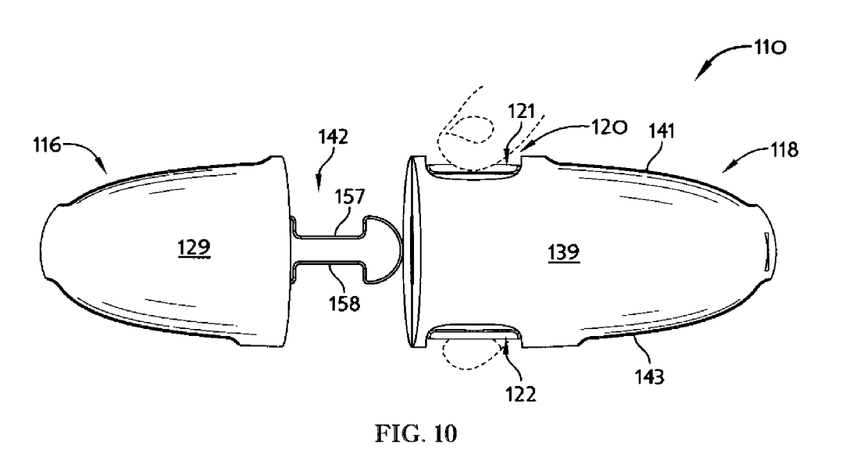
FIG. 10 is another front elevation view of the harness retainer of FIG. 9.

Lock 120 includes a key 142, a top button 121, a bottom button 122, and springs 145, 146 as shown in FIG. 11. Key 142 is coupled to left belt mount 116 and extends out from left belt mount 116 as shown in FIG. 10. Top button 121 and bottom button 122 are coupled to right belt mount 118 and each moves from an engaged position to a disengaged position. In the engaged position, each button 121, 122 contacts key 42 to block movement of left belt mount 116 away from right belt mount 118 as shown in FIGS. 12 and 12A. In the disengaged position each button 121, 122 is moved out of contact with key 142, as shown in FIGS. 13 and 13A, and buttons 121, 122 allow movement of left belt mount 116 away from right belt mount 118 as shown in FIGS. 14 and 14A. Springs 145, 146 bias buttons 121, 122 to the engaged position. Buttons 121, 122 and springs 145, 146 cooperate to form a release actuator coupled to right belt mount 118.

Key 142 is metallic in the illustrative embodiment and is sized to be received in an opening 135 formed between rear shell 134 and front shell 136 of right belt mount 118 as shown in FIG. 14. Key 142 includes a stem 148 and a catch 150 as shown, for example, in FIG. 11. Stem 148 is received in left belt mount 116 and is formed to include a hole 152 and an anti-rotation flange 154. Hole 152 is sized and located to receive fastener 128. Anti-rotation flange 154 extends perpendicular to the longitudinal axis of key 142 and is received in a slot (not shown) formed by front shell 126 of left belt mount 116 to block rotation of stem 148 about fastener 128. Catch 150 extends out of left belt mount 116 and is I-shaped forming a top engagement opening 157 and a bottom engagement opening 158.

Top button 121 is mounted to right belt mount 118 along a top side 141 of right belt mount 118 as shown in FIG. 10. Top button 121 moves toward a bottom side 143 of right belt mount 118 when top button 121 moves from the engaged position to the disengaged position. Button 122 is mounted to right belt mount 118 along bottom side 141 of right belt mount 118. Bottom button 122 moves toward top side 141 of right belt mount 118 when button 122 moves from the engaged position to the disengaged position.

Buttons 121, 122 are each formed to include a press plate 160, a stem 162, and a blocker 164 as shown in FIG. 11. Press plate 160 is accessible to a caregiver through openings 161, 163 formed by the cooperation of rear shell 134 and front shell 136 of right belt mount 118 so that a user can apply a force F on press plates 160 as shown in FIG. 13. Stem 162 extends from press plate 160 to pass around catch 150. Blockers 164 are coupled to stems 162 and are spaced apart from push plates 160 as shown in FIG. 11. Blockers 164 are sized to be received in engagement openings 157, 158.

In the locked configuration of lock 120, catch 150 of key 142 is inserted into slot 135 of the right belt mount 118 as shown in FIG. 12. Also, buttons 121, 122 are in the engaged position so that blockers 164 are received in engagement openings 157, 158 of catch 150 blocking removal of key 142 from slot 135 thereby blocking movement of left belt mount 116 relative to right belt mount 118 as shown in FIG. 12A.

In the unlocked configuration of lock 120, buttons 121, 122 are moved simultaneously to the disengaged position by a user applying forces perpendicular to a longitudinal axis 165 of harness retainer 110 in both a downward direction and an upward direction toward the center of right belt mount 118 onto press plates 160 of buttons 121, 122 as suggested in FIG. 13. When buttons 121, 122 are in the disengaged position, blockers 164 are moved out of engagement openings 157, 158 allowing removal of key 142 from slot 135 thereby allowing movement of left belt mount 116 relative to right belt mount 118 as suggested by arrow 115 in FIGS. 14 and 14A.

Figure 15:
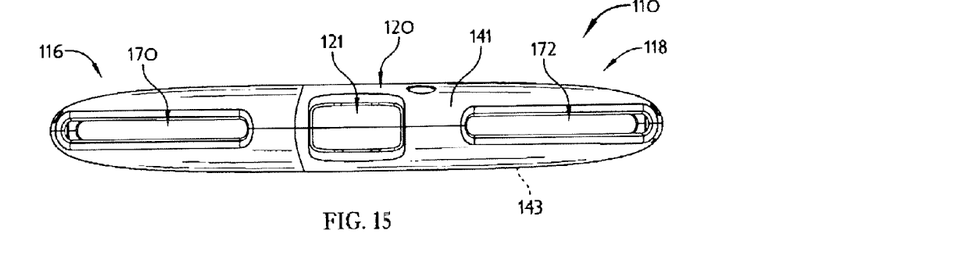
FIG. 15 is a plan view of the harness retainer of FIG. 9.

Rear shell 124 and front shell 126 of left belt mount 116 cooperate to form a left harness belt slot 170 as shown in FIG. 15. Left harness belt slot 170 extends from a top side 171 to a bottom side 173 of left belt mount 116 and is sized to receive left harness belt 17. Left harness belt slot 170 provides means for coupling left harness belt 17 to left belt mount 116.

Rear shell 134 and front shell 136 of right belt mount 118 cooperate to form a right harness belt slot 172 as shown in FIG. 15. Right harness belt slot 172 extends from top side 141 to bottom side 143 of right belt mount 118 and is sized to receive right harness belt 19. Right harness belt slot 172 provides means for coupling right harness belt 19 to right belt mount 118.

According to an embodiment of the disclosure, catch 50 maybe C-shaped. Release actuator 44 may include spring 46 biasing the first button 20 toward the first (engaged) position. Key 42 may be coupled to the first belt mount by a first threaded fastener 28 extending through the stem. First button 20 may be round.

According to an embodiment of the disclosure, first belt mount 16 may include a back shell 24 and front shell 26 coupled to back shell 24 by first threaded fastener 28. Second belt mount 18 may include a back shell 34 and front shell 36 coupled to back shell 34 by second threaded fastener 38.

According to an embodiment of the disclosure, first belt mount 16 and second belt mount 18 are constructed from a first plastics material overmolded by a thermoplastic elastomer.

According to an embodiment of the disclosure, catch 150 may be I-shaped. Release actuator may include first spring 145 biasing first button 121 toward the first (engaged) position and second spring 146 biasing second button 122 toward the first (engaged) position.

According to an embodiment of the disclosure, key 142 may be coupled to first belt mount 116 by first threaded fastener 128 extending through stem 148. First belt mount 116 may include back shell 124 and front shell 126 coupled to back shell 124 by threaded fastener 128.

According to an embodiment of the disclosure, second belt mount 118 may include back shell 134 and front shell 136 coupled to back shell 134 by threaded fasteners 137, 138. First button 121 and second button 122 may be rectangular when viewed from top side 171 of second belt mount 118.

According to an embodiment of the disclosure, rear shell 124 and front shell 126 of first belt mount 116 may cooperate to form first harness belt slot 170. First harness belt slot 170 may extend from top side 171 to bottom side 173 of first belt mount 116.

According to an embodiment of the disclosure, rear shell 134 and front shell 136 of second belt mount 118 may cooperate to form second harness belt slot 172 extending from top side 141 to bottom side 143 of second belt mount 118.

According to an embodiment of the disclosure, the first belt mount 116 and the second belt mount 11B are constructed from a first plastics material overmolded with thermoplastic elastomer.

The invention claimed is:

1. A juvenile vehicle seat comprising
a seat including a bottom and a back arranged to extend up from the bottom,
a harness coupled to the seat, the harness including a left vertically-extending chest belt arranged to extend along a left portion of the back of the seat and a right vertically-extending chest belt arranged to extend along a right portion of the back of the seat, and
a harness retainer for holding the left vertically-extending chest belt and the right vertically-extending chest belt in side-by-side relation, the harness retainer including a left belt mount formed to include a left belt-receiving slot sized to receive the left vertically-extending chest belt, a right belt mount formed to include a right belt-receiving slot sized to receive and support the right vertically-extending chest belt, and a lock,
wherein the lock includes a key coupled to the left belt mount for movement therewith, a blocker movable from an engaged position arranged to block the key from movement along a longitudinal axis of the right belt mount away from the right belt mount to a disengaged position arranged to allow movement of the key along the longitudinal axis of the right belt mount away from the right belt mount, and release means coupled to the right belt mount for moving the blocker from the engaged position to the disengaged position in response to a user applying a force on the release means perpendicular to the longitudinal axis of the right belt mount so that the release means slides the blocker linearly generally perpendicular to the longitudinal axis and relative to the right belt mount freeing the left vertically-extending chest belt received in the left belt-receiving slot of the left belt mount to be moved away from the right vertically-extending chest belt received in the right belt-receiving slot of the right belt mount to liberate a child secured to the seat by the left and the right vertically-extending harness belts.

2. The harness retainer of claim 1, wherein the release means includes a press plate spaced apart from the blocker and a stem arranged to interconnect the press plate and the blocker to cause the blocker to move with the press plate in response to receipt of a user applied a force on the press plate.

3. The harness retainer of claim 2, wherein the release means includes a spring arranged to lie between the right belt mount and the blocker to bias the blocker toward the engaged position.

4. The harness retainer of claim 2, wherein the key includes a stern housed inside the left belt mount and a catch arranged to extend outside the left belt mount, the catch is formed to include an engagement opening, and the engagement opening is sized to receive the blocker when the blocker is in the engaged position.

5. A juvenile vehicle seat comprising
a seat including a bottom and a back arranged to extend up from the bottom,
a harness coupled to the seat, the harness including a left vertically-extending chest belt arranged to extend along a left portion of the back of the seat and a right vertically-extending chest belt arranged to extend along a right portion of the back of the seat, and
a harness retainer for holding the left vertically-extending chest belt and the right vertically-extending chest belt in side-by-side relation, the harness retainer including a left belt mount formed to include a left belt-receiving slot sized to receive the left vertically-extending chest belt, a right belt mount formed to include a right belt receiving slot sized to receive and support the right vertically-extending chest belt, and a lock,
wherein the lock includes a. key coupled to the left belt mount for movement therewith, a blocker movable from an engaged position arranged to block the key from movement along a longitudinal axis of the right belt mount away from the right belt mount to a disengaged position arranged to allow movement of the key along the longitudinal axis of the right belt mount away from the right belt mount, and release means coupled to the right belt mount for moving the blocker from the engaged position to the disengaged position in response to a user applying a force on the release means perpendicular to the longitudinal axis of the right belt mount so that the release means slides relative to the right belt mount freeing the left vertically-extending chest belt received in the left belt-receiving slot of the left belt mount to be moved away from the right vertically-extending chest belt received in the right belt-receiving slot of the right belt mount to liberate a child secured to the seat by the left and the right vertically-extending harness belts,
wherein the release means includes a press plate spaced apart from the blocker and a stem arranged to interconnect the press plate and the blocker to cause the blocker to move with the press plate in response to receipt of a user applied a force on the press plate,
wherein the key includes a stern housed inside the left belt mount and a catch arranged to extend outside the left belt mount, the catch is formed to include an engagement opening, and the engagement opening is sized to receive the blocker when the blocker is in the engaged position, and
wherein the catch is further formed to include a release slot arranged to communicate with the engagement opening and sized to allow the stern to pass through the release slot and into the engagement opening when the blocker is moved to the disengaged position.

6. The harness retainer of claim 5, wherein the catch is C-shaped and extends around more than half of the blocker when the blocker is in the engaged position.

7. The harness retainer of claim 5, wherein the right belt mount includes a rear shell and a front shell coupled to the rear shell to define and interior space therebetween, the blocker is arranged in the interior space between the rear shell and the front shell, and the catch is sized to extend into the interior space between the rear shell and the front shell through a gap formed between the rear shell and the front shell.

8. A harness retainer for holding a left vertically-extending chest belt and a right vertically-extending, chest belt in side-by-side relation, the harness retainer comprising a left belt mount formed to include a left belt-receiving slot sized to receive a left vertically-extending chest belt, a right belt mount formed to include a right belt-receiving slot sized to receive and support a right vertically-extending chest belt, and a lock including a key coupled to the left belt mount for movement therewith, a button coupled to the right belt mount to slide linearly relative to the right belt mount perpendicular to a longitudinal axis of the right belt mount from an engaged position wherein the button is arranged to block the key from movement along the longitudinal axis of the right belt mount away from the right belt mount to a disengaged position arranged to allow movement of the key along the longitudinal axis of the right belt mount away from the right belt mount, and a spring arranged to lie between the right belt mount and the button to bias the button toward the engaged position.

9. The harness retainer of claim 8, wherein the button is a monolithic component formed to include a press plate exposed to receive a user applied force, blocker spaced apart from the press plate, and a stem arranged to interconnect the press plate and the blocker to cause the blocker to move with the press plate in response to receipt of a user applied force on the press plate.

10. The harness retainer of claim 9, wherein the press plate is exposed between a top side and a bottom side of the belt mount and the press plate is mounted for movement toward a back side of the right belt mount in response to receipt of a user applied force.

11. The harness retainer of claim 9, wherein the key includes a stem coupled to the left belt mount and a catch formed to include an engagement opening sized to receive the blocker when the blocker is in the engaged position.

12. A harness retainer for holding a left vertically-extending chest belt and a right vertically-extending chest belt in side-by-side relation, the harness retainer comprising a left belt mount formed to include a left belt-receiving slot sized to receive a left vertically-extending chest belt, a right belt mount formed to include a right belt-receiving slot sized to receive and support a right vertically-extending chest belt, and a lock including a key coupled to the left belt mount for movement therewith, a button coupled to the right belt mount to slide relative to the right belt mount perpendicular to a longitudinal axis of the right belt mount from an engaged position arranged to block the key, from movement along the longitudinal axis of the right belt mount away from the right belt mount to a disengaged position arranged to allow movement of the key along the longitudinal axis of the right belt mount away from the right belt mount, and a spring arranged to lie between the right belt mount and the button to bias the button toward the engaged position, wherein the button is a monolithic component formed to include a press plate exposed to receive a user applied force, a blocker spaced apart from the press plate, and a stem arranged to interconnect the press plate and the blocker to cause the blocker to move with the press plate in response to receipt of a user applied force on the press plate, wherein the key includes a stem coupled to the left belt mount and a catch formed to include an engagement opening sized to receive the blocker when the blocker is in the engaged position, and wherein the catch is further formed to include a release slot arranged to communicate with the engagement opening and sized to allow the stem to pass through the release slot when the blocker is moved to the disengaged position.

13. The harness retainer of claim 12, wherein the catch is C-shaped and extends around more than half of the blocker when the blocker is in the engaged position.

14. The harness retainer of claim 12, wherein the right belt mount includes a rear shell and a front shell coupled to the rear shell to define and interior space therebetween, the blocker is arranged in the interior space between the rear shell and the front shell, and the catch is sized to extend into the interior space between the rear shell and the front shell through a gap formed between the rear shell and the front shell.

15. A harness retainer for holding a left vertically-extending chest belt and a right vertically-extending chest belt in side-by-side relation, the harness retainer comprising a right belt mount adapted to be coupled to a right vertically-extending chest belt, a left belt mount adapted to be coupled to a left vertically-extending chest belt and movable from a first position arranged adjacent to the right belt mount to a second position spaced apart from the right belt mount, and a lock movable from a locked configuration arranged to block movement generally along an axis of the left belt mount relative to the right belt mount to an unlocked configuration arranged to allow movement of the left belt mount relative to the right belt mount, the lock including a key coupled to the left belt mount for movement therewith and a button coupled to the right belt mount to slide generally perpendicular to the axis and relative to the right belt mount between an engaged position when the lock is in the locked configuration in which the button engages the key to block movement of the key relative to the right belt mount and a disengaged position when the lock is in the unlocked configuration in which the button disengages the key to allow movement of the key relative to the right belt mount.

16. The harness retainer of claim 15, wherein the button includes a press plate exposed to receive a user applied force, a blocker spaced apart from the press plate, and a stem arranged to interconnect the press plate and the blocker to cause the blocker to move with the press plate in response to receipt of a user applied force on the press plate.

17. The harness retainer of claim 16, wherein the lock includes a spring arranged to lie between the right belt mount and the button to bias the button toward the engaged position.

18. The harness retainer of claim 16, wherein the key extends outward from the left belt mount and is formed to include an engagement opening sized to receive the blocker when the button is in the engaged position.

19. A harness retainer for holding a left vertically-extending chest belt and a right vertically-extending chest belt in side-by-side relation, the harness retainer comprising a right belt mount adapted to be coupled to a right vertically-extending chest belt, a left belt mount adapted to be coupled to a left vertically-extending chest belt and movable from a first position arranged adjacent to the right belt mount to a second position spaced apart from the right belt mount, a lock movable from a locked configuration arranged to block movement of the left belt mount relative to the right belt mount to an unlocked configuration arranged to allow movement of the left belt mount relative to the right belt mount, the lock including a key coupled to the left belt mount for movement therewith and a button coupled to the right belt mount to slide relative to the right belt mount between an engaged position when the lock is in the locked configuration in which the button engages the key to block movement of the key relative to the right belt mount and a disengaged position when the lock is in the unlocked configuration in which the button disengages the key to allow movement of the key relative to the right belt mount, wherein the button includes a press plate exposed to receive a user applied force, a blocker spaced apart from the press plate, and a stem arranged to interconnect the press plate and the blocker to cause the blocker to move with the press plate in response to receipt of a user applied force on the press plate, wherein the key extends outward from the left belt mount and is formed to include an engagement opening sized to receive the blocker when the button is in the engaged position, and wherein a catch is formed to include a release slot arranged to communicate with the engagement opening and sized to allow the stem to pass through the release slot when the button is moved to the disengaged position.

20. A harness retainer for holding a left vertically-extending chest belt and a right vertically extending chest belt in side-by-side relation, the harness retainer comprising a right belt mount adapted to be coupled to a right vertically-extending chest belt, a left belt mount adapted to be coupled to a left vertically-extending chest belt and movable from a first position arranged adjacent to the right belt mount to a second position spaced apart from the right belt mount, a lock movable from a locked configuration arranged to block movement of the left belt mount relative to the right belt mount to an unlocked configuration arranged to allow movement of the left belt mount relative to the right belt mount, the lock including a key coupled to the left belt mount for movement therewith and a button coupled to the right belt mount to slide relative to the right belt mount between an engaged position when the lock is in the locked configuration in which the button engages the key to block movement of the key relative to the right belt mount and a disengaged position when the lock is in the unlocked configuration in which the button disengages the key to allow movement of the key relative to the right belt mount, wherein the button includes a press plate exposed to receive a user applied force, a blocker spaced apart from the press plate, and a stein arranged to interconnect the press plate and the blocker to cause the blocker to move with the press plate in response to receipt of a user applied force on the press plate, wherein the key extends outward from the left belt mount and is formed to include an engagement opening sized to receive the blocker when the button is in the engaged position, and wherein a C-shaped catch extends around more than half of the blocker when the button is in the engaged position.

\* \* \* \* \*

UNITED STATES PATENT AND TRADEMARK OFFICE
CERTIFICATE OF CORRECTION

PATENT NO. : 9,174,606 B2  
APPLICATION NO. : 13/934363  
DATED : November 3, 2015  
INVENTOR(S) : Mei-Hui Lin et al.

Page 1 of 1

It is certified that error appears in the above-identified patent and that said Letters Patent is hereby corrected as shown below:

Add to Title Page (30) Foreign Application Priority Data  
July 6, 2012    (CN) .............................. 201220329884 U Signed and Sealed this  
Sixteenth Day of August, 2016

Michelle K. Lee  
*Director of the United States Patent and Trademark Office*